United States Patent
Gloaguen et al.

(10) Patent No.: US 6,801,081 B2
(45) Date of Patent: Oct. 5, 2004

(54) SWITCHING DEVICE PROVIDED WITH INTEGRATED TEST MEANS

(75) Inventors: Gilbert Gloaguen, Tourville-sur-Odon (FR); Olivier Burg, Caen (FR); Bassem Fahs, Caen (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 86 days.

(21) Appl. No.: 10/299,276

(22) Filed: Nov. 19, 2002

(65) Prior Publication Data

US 2003/0137339 A1 Jul. 24, 2003

(30) Foreign Application Priority Data

Nov. 23, 2001 (FR) .............................. 01 15175

(51) Int. Cl.[7] .............................. G06G 7/12; G06G 7/18
(52) U.S. Cl. ...................................... 327/565; 324/765
(58) Field of Search .............................. 327/334, 336, 327/564, 565; 324/527, 765

(56) References Cited

U.S. PATENT DOCUMENTS 5,471,468 A * 11/1995 Sandin et al. ............... 370/389
6,272,337 B1 * 8/2001 Mount et al. ............... 455/423

FOREIGN PATENT DOCUMENTS

EP         0229433        8/1990    ........... G06F/11/26

* cited by examiner

*Primary Examiner*—My-Trang Nuton
(74) *Attorney, Agent, or Firm*—Aaron Waxler

(57) ABSTRACT

The invention relates to a switching device comprising a matrix having connection points and integrated test means comprising two pairs of generators/detectors which are pairwise controlled in such a way that the transmission paths traversed by the RF test signals from the generators to the associated inputs of the matrix and from the outputs of the matrix and to the associated detector are of the order of length of a single side of the switching matrix.

7 Claims, 2 Drawing Sheets

SWITCHING DEVICE PROVIDED WITH INTEGRATED TEST MEANS

The invention relates to integrated circuits dedicated to high rate transmissions, provided with integrated RF test means. In particular, it relates to a switching device comprising a plurality of inputs and outputs connected by means of connection points constituting a switching matrix which is driven by a control member for switching signals supplied at said inputs to said outputs, the device comprising integrated test means controlled by said control member so as to test the operation of said connection points.

The invention also relates to an integrated circuit comprising such a device. Finally, it relates to an autoswitch of a transmission system using optical connections and comprising such a device.

The invention finds numerous applications, notably in optical transmission systems. It is particularly advantageous in applications for high rate packet switching.

The integrated circuits operating at a high rate, which may range up to several gigabits per second, necessitate appropriate test tools. Indeed, it is difficult, at the level of the test during production, to externally inject signals having such high frequencies into the circuits.

European application published under no. EP 229 433 describes a test circuit for a combinatory logic circuit and an integrated circuit comprising such a device. The device is provided with integrated test means with which the circuit under production can be tested, i.e. testing the operation of each connection point of a switching matrix. These means comprise a test signal generator for generating predetermined test signals and a detector for detecting whether the test signals supplied at the inputs of the switching device are correctly received at the outputs.

The use of a single couple of a generator and a detector as described in the above-mentioned application has certain drawbacks. The paths traversed by the test signals from the test signal generator to the selected input of the circuit to be tested, on the one hand, and from the corresponding output to the signal detector, on the other hand, are relatively long for RF transmissions. In the majority of cases, the path traversed is of the order of three times on both sides of the circuit, i.e. upstream and downstream of the circuit. This path length is considerable for RF transmissions and may have detrimental losses at the origin for the performance of the circuit. Another drawback is that this test configuration implies that the paths in the reverse direction, i.e. upstream and downstream of the circuit must be traced parallel along each other until they sometimes cross each other as a function of the trace constraints. The parallel transmission lines and those in the reverse direction, as well as the line crossings, also have the tendency of introducing perturbations in the RF transmissions. These perturbations are detrimental for the performance of the circuit. During operation in the test mode, the measures taken may be altered considerably because of these perturbations, which reduces the reliability of the realized test.

It is an object of the invention to provide a switching device provided with integrated test means which does not have the drawbacks of the known device.

To this end, a device of the type described in the opening paragraph is provided, which is characterized in that the integrated test means comprise:

- a first generator for generating a first predetermined test sequence on a first part of said inputs,
- a second generator for generating a second predetermined test sequence on a second part of said inputs, the generators being fed by one and the same clock signal,
- a first detector for detecting whether said first or second test sequences are correctly received at a first part of said outputs, and
- a second detector for detecting whether said first or second test sequences are correctly received at a second part of said outputs.

This configuration of the test means separates the inputs and the outputs in two parts. Each generator delivers a part of the inputs and each detector receives a part of the outputs. These test means provide the possibility of limiting the distances traversed by the RF signals in the test paths on both sides of the switching matrix and of avoiding that the paths cross each other or get longer.

These and other aspects of the invention are apparent from and will be elucidated, by way of non-limitative example, with reference to the embodiment(s) described hereinafter.

Figure 1:
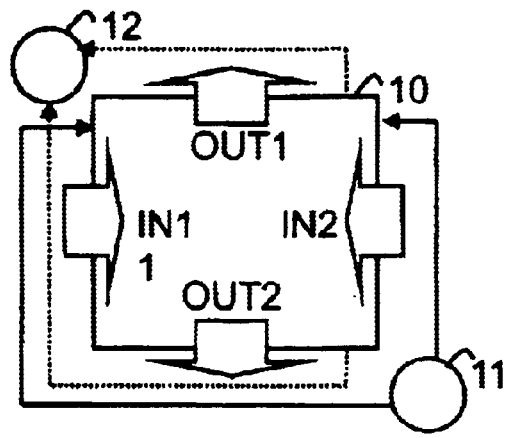
FIG. 1 is a functional diagram illustrating a device of the prior art.

FIG. 1 shows an example of the switching device in accordance with the prior art, comprising integrated test means as represented by European patent application no. 229 483. The device comprises a switching matrix 10 having a plurality of inputs IN1 and IN2 arranged horizontally on two opposite sides of the matrix, and a plurality of outputs OUT1 and OUT2 arranged vertically on the two other sides of the matrix. The plurality of inputs and outputs is represented diagrammatically by a single incoming and outgoing arrow, respectively, on the side of the matrix. The switching matrix allow connection of each input to each output of the matrix by means of a connection point (not shown). Integrated test means are provided to control the operation of each connection point of the matrix. The test means comprise an RF test signal generator 11 and a signal detector 12 arranged proximate to the two opposed corners of the switching matrix and connected to the inputs and outputs by way of RF transmission paths. The generator 11 is provided to generate a predetermined test sequence at inputs of the matrix, selected in accordance with a predefined test program. A control device (not shown) provides the possibility of programming the test sequences and selecting the input and the output corresponding to each connection point to be tested. The detector 12 is provided to detect whether the test sequence is (correctly) received at the selected output. FIG. 1 shows that the sum of the lengths of the transmission paths to be traversed by the RF test signals is of the order of length of the perimeter of the switching matrix for each connection point to be tested. Moreover, the paths may cross each other and become longer on a substantial part of the path to be traversed, which is capable of disturbing the operation of the matrix by introducing interference or noise when the RF signals are transmitted at high frequencies of the order of gigahertz.

Figure 2:
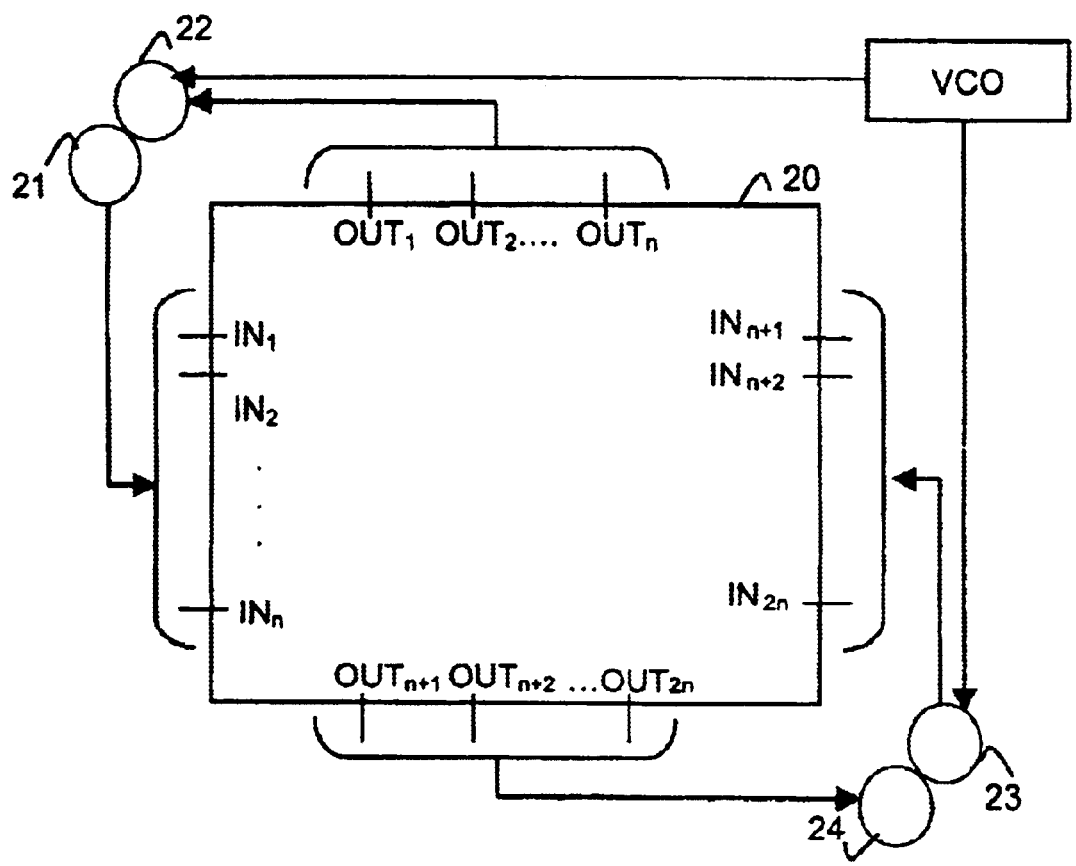
FIG. 2 is a functional diagram illustrating an example of the device according to the invention.

FIG. 2 shows an embodiment of a device according to the invention, with which the drawbacks of the known device can be remedied. FIG. 2 illustrates in a very diagrammatical manner an example of a switching device comprising a square switching matrix 20 of the 2n×2n type, n being an integer, provided with a plurality of inputs, denoted $IN_1$ to $IN_n$, and outputs, denoted $OUT_1$ to $OUT_{2n}$. The invention is also applicable to rectangular matrices. In accordance with the application considered, each input and output may comprise 2 differential components. The device comprises integrated test means comprising a first couple of a generator 21 and a detector 22 and a second couple of a generator 23 and a detector 24, which are interconnected by clock-generating means, for example, of the VCO (Voltage-Controlled Oscillator) type, which supply a periodic clock signal. The clock-generating means VCO are provided to synchronize at least the two generators on the same time base, such that at each clock front, the generated signal changes the state in accordance with a predetermined test sequence. The predetermined test sequence may be different from generator to generator, from the moment when the two generators are synchronized. The generator of the first couple 21 is provided to supply predetermined RF test sequences on only one part of possible inputs, i.e., for example, the inputs $IN_1$ to $IN_n$, so as to limit the length of the RF path to be traversed to once the length on one side of the matrix. The detector of the first couple 22 is provided to detect the signals received by only one part of the outputs, i.e., for example, the outputs $OUT_1$ to $OUT_n$, independently of the inputs at which the received signals have been supplied. The role of the detector is to verify whether the considered connection point functions correctly at the useful frequency, for example, 12.5 gbit/s. To this end, the detector detects whether the sequence received at the selected output corresponding to the connection point to be tested is identical to the sequence supplied at the corresponding input. Preferably, this known sequence is locally regenerated at the level of the detector and then compared with the received sequence so as to determine whether the sequences are identical and to deduce whether the considered connection point functions normally. In a symmetrical manner, the generator 23 and the detector 24 of the second couple are provided to generate and detect, respectively, the signals supplied and received at the other part of the inputs and outputs, denoted $IN_{n+1}$ to $IN_{2n}$ and $OUT_{n+1}$ to $OUT_{2n}$, respectively. Each generator and each detector of a given couple may supply or receive signals intended for or coming from any input or output, associated with the same couple or with the other couple of generator and detector. Indeed, the detector may receive signals generated by any one of the RF signal generators. This is why the two generators must be synchronized. Control means (not shown) allow the predetermined test sequences to be programmed and to select the inputs and outputs corresponding to each connection point to be tested. The RF test signals generated by the generators 21 and 23 may be pseudo-random signals of the PRBS type (Pseudo-Random Bit Stream). These signals and the way in which they are generated are well known. For example, pseudo-random sequences of $2^7-1$ (127) states generated from a register of 7 flip-flops and one exclusive-OR gate may be used. Details of these signals have been described in literature.

Figure 3:
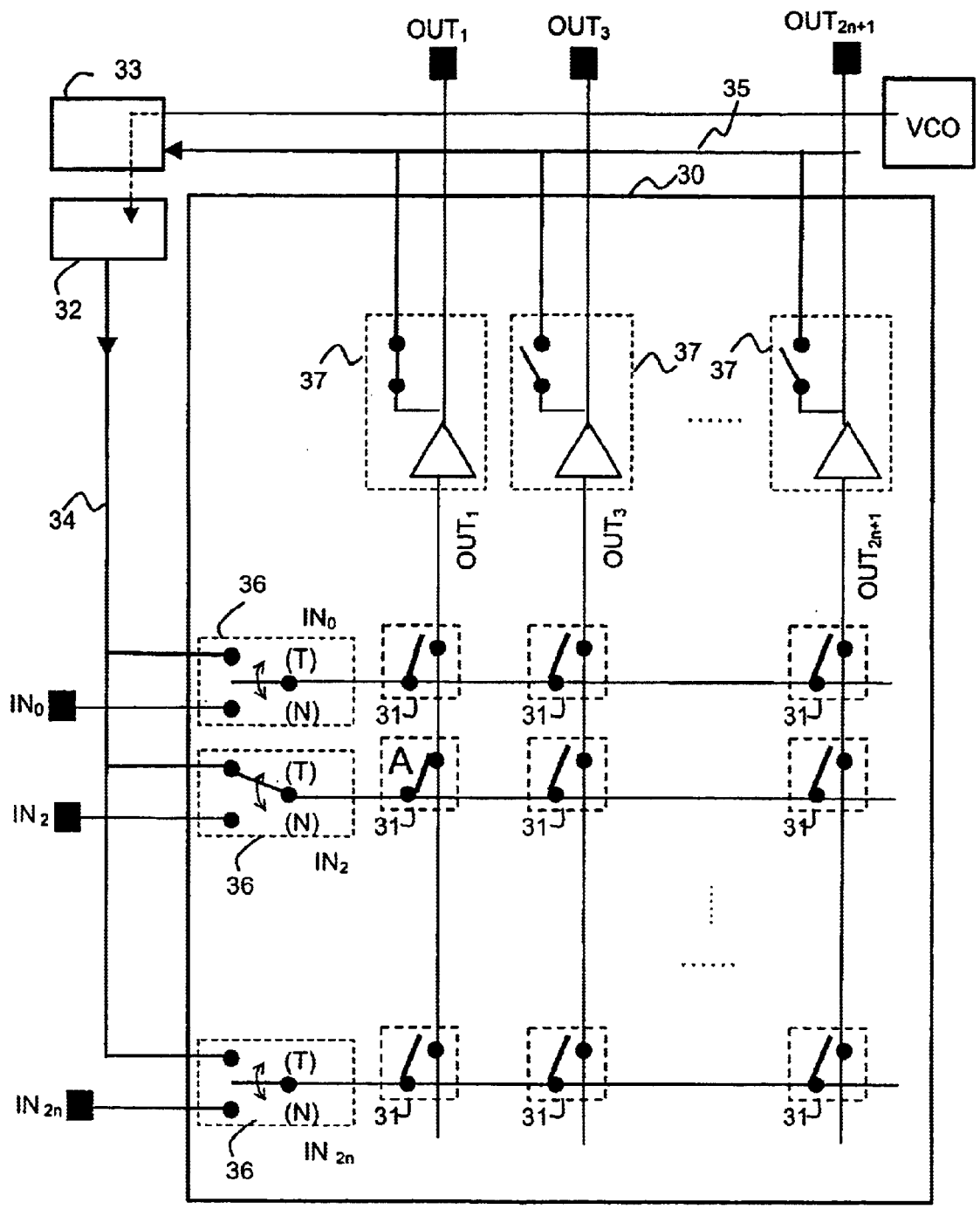
FIG. 3 is a functional diagram illustrating a particular embodiment of the device shown in FIG. 2.

FIG. 3 illustrates in a detailed manner an embodiment of the device according to the invention, shown diagrammatically in FIG. 2. The device comprises a switching matrix 30 comprising connection points which are represented by switches 31 to be tested. Only the even inputs and the odd outputs of the matrix are shown in the Figure. The device also comprises a couple of a generator 32 and a detector 33 for RF signals intended to test the operation of the connection points of the matrix. A single couple of RF signal generator and detector corresponding to the even inputs and the odd outputs, respectively, is illustrated in FIG. 3. The signal generator 32 is connected to the even inputs denoted $IN_0$, $N_2$ ... $IN_{2n}$ by way of an upstream transmission path 34. The signal detector 33 is connected to the odd outputs denoted $OUT_1$, $OUT_3$ ... $OUT_{2n+1}$ by way of a downstream transmission path 35. Upstream switching devices 36 are provided at each input so as to allow switching of the matrix 30 in the test mode (T) or in the normal operating mode (N). Equivalent downstream switching devices 37, comprising a switch, are provided downstream at each odd output so as to change from the test mode to the normal operating mode. A central control device (not shown) allows control of each upstream switching device 36 or downstream switching device 37 to change from one operating mode to the other. In accordance with a predefined test program at the level of the control device, a connection point, for example, the point A represented by the switch 31 connecting the input $IN_2$ to the output $OUT_1$ is selected to be tested. Under the control of the control device, the switch 31 corresponding to the selected connection point A realizes a connection point between the input $IN_2$ and the output $OUT_1$ with a view to testing the operation of the connection. The upstream switching device 36 associated with the input $IN_2$ as well as the downstream switching device 37 connected to the output $OUT_1$ are set in the test mode (switch closed) by the control member so as to pass the test signals from the generator 32 and to the detector 33. The signal generator 32 connected to the input $IN_2$ then transmits a predefined test sequence via the upstream transmission path 34. The test sequence is transmitted at the output $OUT_1$ via the upstream switch 36, the switch 31 to be tested and the downstream switch 37. The test signal subsequently reaches the detector 33 by following the downstream transmission path 35. In accordance with a particular embodiment, a clock signal generator VCO supplies a clock signal to the generator 32 via the detector 33.

What is claimed is:

1. A switching device comprising a plurality of inputs and outputs connected by means of connection points constituting a switching matrix which is driven by a control member for switching signals supplied at said inputs to said outputs, the device comprising integrated test means controlled by said control member so as to test the operation of said connection points, characterized in that said integrated test means comprise:

a first generator for generating a first predetermined test sequence on a first part of said inputs, a second generator for generating a second predetermined test sequence on a second part of said inputs, the generators being fed by same clock signal, a first detector for detecting whether said first or second test sequences are correctly received at a first part of said outputs, and a second detector for detecting whether said first or second test sequences are correctly received at a second part of said outputs.

2. A device as claimed in claim 1, wherein the generators and detectors are placed proximate to the corresponding inputs and outputs.

3. A device as claimed in claim 2, wherein the switching matrix is a rectangular matrix, the first and second parts of the inputs and outputs being placed on opposite sides, characterized in that the generators and detectors are pairwise arranged proximate to the two opposite corners of the matrix.

4. A device as claimed in claim 3, wherein the predetermined test signals are transmitted from each generator to the associated inputs and from the outputs to each associated detector on transmission paths passing through all of the inputs associated with each generator and all of the outputs associated with each detector, the generators and detectors being pairwise arranged around the switching matrix, such that each transmission path is of the order of length of one side of said matrix.

5. A device as claimed in claim 3, further including a clock generating means, wherein the clock-generating means intended to feed the two generators are placed proximate to a free corner.

6. An integrated circuit comprising a device as claimed in claim 1.

7. An autoswitch for an optical transmission system comprising a device as claimed in claim 1.

* * * * *